(12) United States Patent
Kobayashi

(10) Patent No.: US 10,634,895 B2
(45) Date of Patent: Apr. 28, 2020

(54) MICROSCOPE APPARATUS, AUTOMATIC FOCUSING DEVICE, AND AUTOMATIC FOCUSING METHOD

(71) Applicant: OLYMPUS CORPORATION, Hachioji-shi, Tokyo (JP)

(72) Inventor: Masaru Kobayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/270,712

(22) Filed: Sep. 20, 2016

(65) Prior Publication Data

US 2017/0090175 A1   Mar. 30, 2017

(30) Foreign Application Priority Data

Sep. 25, 2015 (JP) .................. 2015-188906

(51) Int. Cl.
| | |
|---|---|
| G02B 7/28 | (2006.01) |
| G02B 21/24 | (2006.01) |
| G02B 21/00 | (2006.01) |
| G02B 5/00 | (2006.01) |
| G02B 21/02 | (2006.01) |
| G02B 21/08 | (2006.01) |
| G02B 27/14 | (2006.01) |
| G02B 27/28 | (2006.01) |

(52) U.S. Cl.
CPC .......... G02B 21/245 (2013.01); G02B 5/005 (2013.01); G02B 7/287 (2013.01); G02B 21/0088 (2013.01); G02B 21/02 (2013.01); G02B 21/082 (2013.01); G02B 27/141 (2013.01); G02B 27/283 (2013.01)

(58) Field of Classification Search
CPC ........................................................ G02B 7/32
See application file for complete search history.

(56) References Cited

U.S. PATENT DOCUMENTS

| | | | |
|---|---|---|---|
| 2011/0127406 A1* | 6/2011 | Sase ...................... | G02B 21/245 250/201.3 |
| 2012/0097835 A1* | 4/2012 | Sharonov ........... | G02B 21/0032 250/201.3 |
| 2012/0320453 A1* | 12/2012 | Kaneki ................ | G02B 21/082 359/379 |

(Continued)

FOREIGN PATENT DOCUMENTS

| | | |
|---|---|---|
| JP | H07134242 A | 5/1995 |
| JP | 08334317 A | 12/1996 |

(Continued)

OTHER PUBLICATIONS

Japanese Office Action dated Jun. 4, 2019 (and English translation thereof) issued in Japanese Application No. 2015-188906.

*Primary Examiner* — Thanh Luu
(74) *Attorney, Agent, or Firm* — Holtz, Holtz & Volek PC

(57) ABSTRACT

A microscope apparatus includes an objective and an automatic focusing device. The automatic focusing device is an automatic focusing device of an active type that irradiates a specimen with automatic focusing light via the objective, and the automatic focusing device is configured in such away that an illumination light axis of the automatic focusing light passes through a position distant from an optical axis of the objective.

11 Claims, 5 Drawing Sheets

(56) References Cited

U.S. PATENT DOCUMENTS

2013/0335818 A1* 12/2013 Knebel .............. G01N 21/6458
359/385
2016/0041366 A1* 2/2016 Sakamoto .............. G02B 21/02
250/201.3

FOREIGN PATENT DOCUMENTS

| JP | 2007148161 A | 6/2007 |
| JP | 2008185875 A | 8/2008 |
| JP | 5035600 B2 | 9/2012 |
| JP | 5070696 B2 | 11/2012 |
| JP | 2012212018 A | 11/2012 |
| JP | 2013003333 A | 1/2013 |

* cited by examiner

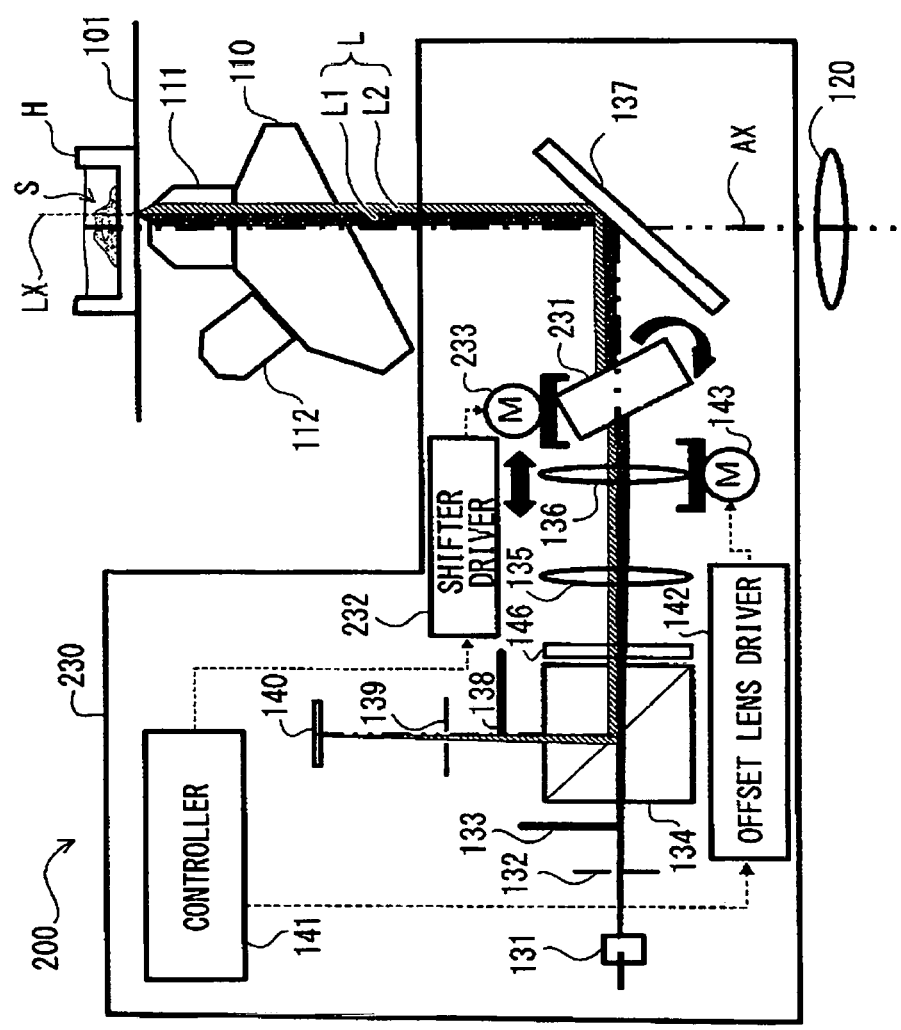
F I G. 4

MICROSCOPE APPARATUS, AUTOMATIC FOCUSING DEVICE, AND AUTOMATIC FOCUSING METHOD

CROSS REFERENCE TO RELATED APPLICATIONS

This application is based upon and claims the benefit of priority from prior Japanese Patent Application No. 2015-188906, filed Sep. 25, 2015, the entire contents of which are incorporated herein by this reference.

BACKGROUND OF THE INVENTION

Field of the Invention

The present invention relates to a technology relating to a microscope apparatus including an automatic focusing device, the automatic focusing device, and an automatic focusing method.

Description of the Related Art

An active automatic focusing device used for a microscope detects feeble reflected light generated due to reflection of automatic focusing light (hereinafter referred to as AF light) applied to a specimen, and detects a focusing state on the basis of a detection signal. Accordingly, feeble stray light that is not a problem in usual microscopic observation may become a factor that interferes with an appropriate focusing determination.

In the field of microscopes, various technologies have been proposed for suppressing an adverse effect of stray light on focusing determination. As an example, Japanese Laid-Open Patent Publication No. 2007-148161 describes a technology for restricting a range in which a focal position adjustment lens moves to a range in which stray light that has been specified as a result of measurement is not generated. In addition, Japanese Laid-Open Patent Publication No. 2012-212018 describes a technology for correcting a detection signal in accordance with an intensity of stray light that has been measured.

SUMMARY OF THE INVENTION

According to an aspect of the present invention, a microscope apparatus is provided that includes: an objective; and an automatic focusing device of an active type that irradiates a specimen with automatic focusing light via the objective, the automatic focusing device being configured in such a way that an illumination light axis of the automatic focusing light passes through a position distant from an optical axis of the objective.

According to another aspect of the present invention, an automatic focusing device of an active type for a microscope apparatus is provided that includes an adjustment mechanism that moves an illumination light axis of automatic focusing light in a prescribed direction with respect to the illumination light axis, the automatic focusing light being applied to a specimen.

According to yet another aspect of the present invention, an automatic focusing method for a microscope apparatus is provided that includes: irradiating a specimen with automatic focusing light via an objective of the microscope apparatus, the automatic focusing light having an illumination light axis that passes through a position distant from an optical axis of the objective; detecting, via the objective, the automatic focusing light reflected by the specimen; and detecting a focusing state in accordance with a detection result of the automatic focusing light reflected by the specimen.

BRIEF DESCRIPTION OF THE DRAWINGS

The present invention will be more apparent from the following detailed description when the accompanying drawings are referenced.

FIG. 4 illustrates a configuration of a microscope apparatus in Example 2.

DESCRIPTION OF THE EMBODIMENTS

None of the conventional technologies prevent generated stray light from entering a photodetector. Accordingly, there is a need for a new technology for suppressing an adverse effect of stray light on focusing determination without performing special signal processing by suppressing the stray light from entering a photodetector even when the stray light is generated.

Example 1

Figure 1:
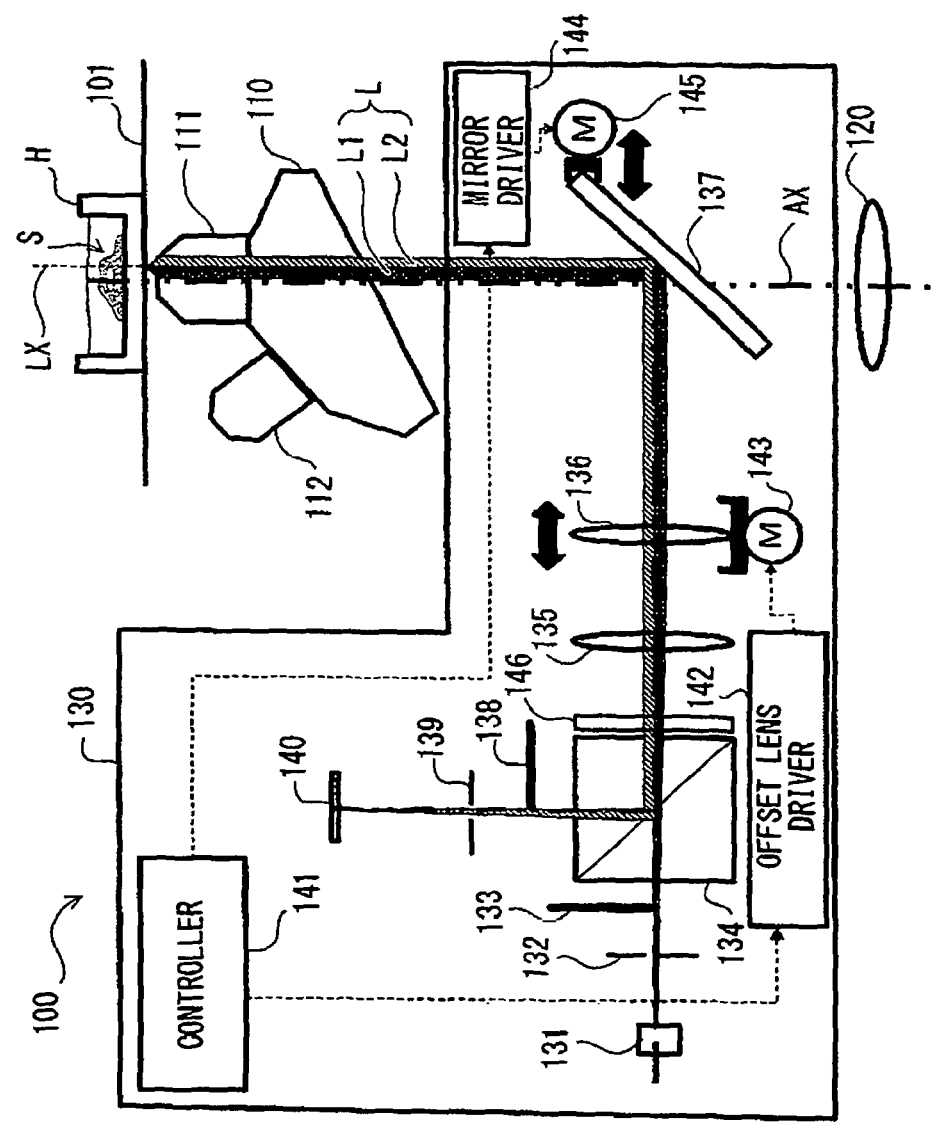
FIG. 1 illustrates a configuration of a microscope apparatus in Example 1.

FIG. 1 illustrates a configuration of a microscope apparatus 100 in this example. The microscope apparatus 100 illustrated in FIG. 1 is a specimen observation apparatus used to observe a specimen S held by a holder H on a stage 101. The microscope apparatus 100 includes objectives (an objective 111 and an objective 112) mounted onto a revolver 110, a tube lens 120, and an automatic focusing device 130 for a microscope apparatus. The specimen S is, for example, a biological specimen immersed into a culture solution, and the holder H is, for example, a petri dish or a multiwell plate.

The revolver 110 is configured in such a way that a plurality of objectives such as the objective 111 or the objective 112 can be attached to the revolver 110. By rotating the revolver 110, an objective used for observation is inserted onto an optical path. FIG. 1 illustrates a state in which the objective 111 has been inserted onto an optical path.

The automatic focusing device 130 is an active automatic focusing device that introduces AF light L1 from a space between the revolver 110 and the tube lens 120 to an illumination light path, irradiates the specimen S with the AF light L1 via the objective 111, and detects AF light L2 that is a reflected light. The automatic focusing device 130 is configured in such a way that an illumination light axis LX of the AF light L1 passes through a position distant from an optical axis AX of the objective 111. Note that the illumination light axis LX is a central axis representing illumination light (AF light). The AF light L1 before being reflected by the specimen S and the AF light L2 after being reflected by the specimen S are collectively referred to as AF light L.

The automatic focusing device 130 includes a light source 131 that emits the AF light L1. The light source 131 is, for example, a laser diode that emits light in an infrared wavelength region. The light source 131 is controlled by a controller 141 described below so as to emit light.

The automatic focusing device 130 further includes an automatic focusing optical system, a photodetector 140, a controller 141, an offset lens driver 142 that drives a motor 143, and a mirror driver 144 that drives a motor 145. The controller 141 is, for example, a circuit that includes a processor and a memory that stores a control program executed by the processor. In this specification, optical elements on which AF light L acts during a period after the AF light L emits from the light source 131 and before the AF light L is detected by the photodetector 140 are collectively referred to as an automatic focusing optical system.

The automatic focusing optical system includes a beam diameter selecting diaphragm 132, an illumination-side stopper 133, a polarization beam splitter (hereinafter referred to as a PBS) 134, a λ/4 plate 146, a lens 135, an offset lens 136, a dichroic mirror 137, a light-receiving-side stopper 138, and a pinhole plate 139 in which a pinhole is formed.

The beam diameter selecting diaphragm 132 is a variable aperture diaphragm that changes a beam diameter of the AF light L1 from the light source 131. The beam diameter is selected considering a pupil diameter of an objective used, or the like. The AF light L1 for which a beam diameter has been adjusted by the beam diameter selecting diaphragm 132 enters the illumination-side stopper 133, and half of a light flux of the AF light L1 is shielded. The remaining half of the light flux that is not shielded with the illumination-side stopper 133 is transmitted through the PBS 134, and enters the lens 135 and the offset lens 136 via the λ/4 plate 146. The AF light L1 is converted to a parallel light flux by the lens 135, and a parallel degree of the light flux is adjusted by the offset lens 136. The offset lens 136 is a means for moving a condensing position of the AF light L1 in a direction of the optical axis AX, and the offset lens 136 is movably arranged so as to move in a direction of an optical axis of the offset lens 136 by driving the motor 143. The motor 143 is driven in accordance with a signal from the offset lens driver 142 under the control of the controller 141.

The offset lens 136 in this example moves, for example, in such a way that, when the AF light L1 is condensed onto a lower surface of the holder H, a focus of the objective 111 is positioned on an upper surface of the holder H (an interface with the specimen S).

The AF light L1 transmitted through the offset lens 136 is reflected in a direction parallel to the optical axis AX of the objective 111 by the dichroic mirror 137, and reaches the objective 111. At this time, the illumination light axis LX of the AF light L1 passes through a position distant from the optical axis AX of the objective 111 according to a position of the dichroic mirror 137. The dichroic mirror 137 is a deflection element that deflects the AF light L1 toward the objective 111, and the dichroic mirror 137 has a characteristic to reflect, for example, light in an infrared wavelength region. The dichroic mirror 137 is movably arranged so as to move in a prescribed direction with respect to the optical axis AX of the objective 111 by driving the motor 145. The motor 145 is driven in accordance with a signal from the mirror driver 144 under the control of the controller 141. Accordingly, in the microscope apparatus 100, the mirror driver 144 is an adjustment mechanism that moves the illumination light axis LX in a prescribed direction with respect to the optical axis AX by moving the dichroic mirror 137 in the prescribed direction with respect to the optical axis AX. In the microscope apparatus 100, the prescribed direction is a direction orthogonal to the optical axis AX of the objective 111.

The AF light L1 output from the automatic focusing device 130 to the objective 111 is applied to the specimen S by the objective 111. More specifically, the AF light L1 reaches one of two regions of a pupil surface of the objective 111 that has been divided into two regions along the optical axis AX, and the AF light L1 reaches the specimen S via the one of the two regions. The AF light L1 applied to the specimen S is reflected by the specimen S, and enters the objective 111 again.

The AF light L2 reflected by the specimen S passes through the other of the two regions described above of the pupil surface of the objective 111. Stated another way, the AF light L passes through different regions of the pupil surface between when the AF light L proceeds toward the specimen S and when the AF light L returns from the specimen S. The AF light L2 then enters the automatic focusing device 130, and is reflected by the dichroic mirror 137. The AF light A2 reflected by the dichroic mirror 137 enters the PBS 134 via the offset lens 136, the lens 135, and the λ/4 plate 146. The AF light L2 is reflected by the PBS 134 because the AF light L2 has a polarization plane orthogonal to a polarization plane of the AF light L1 at the time when the AF light L1 enters the PBS 134 from a side of the light source 131. The AF light L2 enters the pinhole plate 139 via the light-receiving-side stopper 138.

The light-receiving-side stopper 138 is arranged in a position in which regular light (the AF light L2 reflected by the specimen S) is not supposed to enter because half of the light flux of the AF light L1 is shielded with the illumination-side stopper 133. Namely, light that enters the light-receiving-side stopper 138 is stray light, and the light-receiving-side stopper 138 is a light shielding member that suppresses an amount of stray light that enters the photodetector 140. The pinhole plate 139 in which a pinhole aperture has been formed is a light shielding member that suppresses an amount of stray light that enters the photodetector 140, similarly to the light-receiving-side stopper 138. The pinhole plate 139 is a variable aperture diaphragm in which the diameter of a pinhole (the diameter of an aperture) is variable. The pinhole plate 139 is arranged between the lens 135 that functions as an optical system that condenses the AF light L2 onto the photodetector 140 and the photodetector 140 that detects the AF light A2. In addition, the pinhole plate 139 is movably arranged along an optical axis of the lens 135 (an optical axis after being bent by the PBS 134). Stray light can be shielded effectively by adjusting a position of the pinhole plate 139 or the diameter of the aperture. The AF light L2 that has passed through the light-receiving-side stopper 138 and the pinhole plate 139 enters the photodetector 140.

The photodetector 140 is a photodetector that detects the AF light L2, and the photodetector 140 includes a plurality of photodetectors that are arranged in positions symmetry with respect to an optical axis of the automatic focusing optical system. The photodetector 140 is arranged in such a way that light-receiving surfaces of the plurality of photodetectors are located on a focal plane of the automatic focusing optical system (the lens 135). A signal output from the photodetector 140 is amplified at a prescribed amplification factor, and the signal is converted to a digital signal by an A/D converter (not illustrated), and is input to the controller 141.

The controller 141 detects a focusing state on the basis of a detection result of the AF light L2 detected by the photodetector 140. As an example, when the photodetector 140 is a so-called two-divided PD that includes two photodiodes (PDs), the controller 141 detects a focusing state on the basis of signals (a signal A and a signal B) that correspond amounts of the AF light L2 received by the respective two PDs. Specifically, a value obtained by dividing a difference between the signal A and the signal B by the sum of the signal A and the signal B is calculated as an evaluation value EF, and when the evaluation value EF is 0, it is determined that the microscope apparatus 100 is in a focusing state, and the focusing state is detected.

By using the automatic focusing device 130 and the microscope apparatus 100 having the configurations above, even when stray light is generated, the stray light can be suppressed from entering the photodetector 140. Accordingly, an adverse effect of the stray light on focusing determination can be suppressed without performing special signal processing on a signal output from the photodetector 140. This respect is described below in detail.

Stray light that has an adverse effect on focusing determination includes stray light (hereinafter referred to as pseudo regular light) that proceeds toward the photodetector 140 through almost the same route as that of the AF light L2 reflected by the specimen S (hereinafter also referred to as a regular light), and stray light that proceeds toward the photodetector 140 through a different route. The stray light that proceeds toward the photodetector 140 through the different route can be shielded with the light-receiving-side stopper 138 and the pinhole plate 139. Accordingly, by using the microscope apparatus 100, stray light can be suppressed from entering the photodetector 140.

On the other hand, the pseudo regular light cannot be shielded with the light-receiving-side stopper 138 and the pinhole plate 139. Stated another way, the pseudo regular light is stray light that passes through the light-receiving-side stopper 138 and the pinhole plate 139.

When a position of the illumination light axis LX of the AF light L1 changes with respect to the optical axis AX of the objective 111, a state in which stray light is generated changes. This is because, when the position of the illumination light axis LX changes, an angle of the AF light L1 incident on a lens surface of the objective 111 or another lens changes, and consequently a direction in which the generated stray light proceeds also change. Accordingly, by separating the position of the illumination light axis LX from the optical axis AX, pseudo regular light that is generated when the illumination light axis LX matches the optical axis AX can be guided to a position deviating from a pinhole aperture, and can be shielded with the pinhole plate 139. Therefore, stray light can be further suppressed from entering the photodetector 140. It is preferable that it be determined how far from the optical axis AX the illumination light axis LX is set so as to be located after an amount of pseudo regular light generated for each position of the illumination light axis LX has been confirmed in advance in an experience or the like.

In the microscope apparatus 100, the mirror driver 144, which is the adjustment mechanism, may change the position of the illumination light axis LX in accordance with an objective used in observation. A relationship between the position of the illumination light axis LX and an amount of generation of pseudo regular light changes according to an objective, but, by changing the position of the illumination light axis LX in accordance with an objective, an amount of generation of pseudo regular light can be suppressed regardless of the type of an objective. Consequently, stray light can be suppressed from entering the photodetector 140 regardless of the type of an objective.

Figure 2:
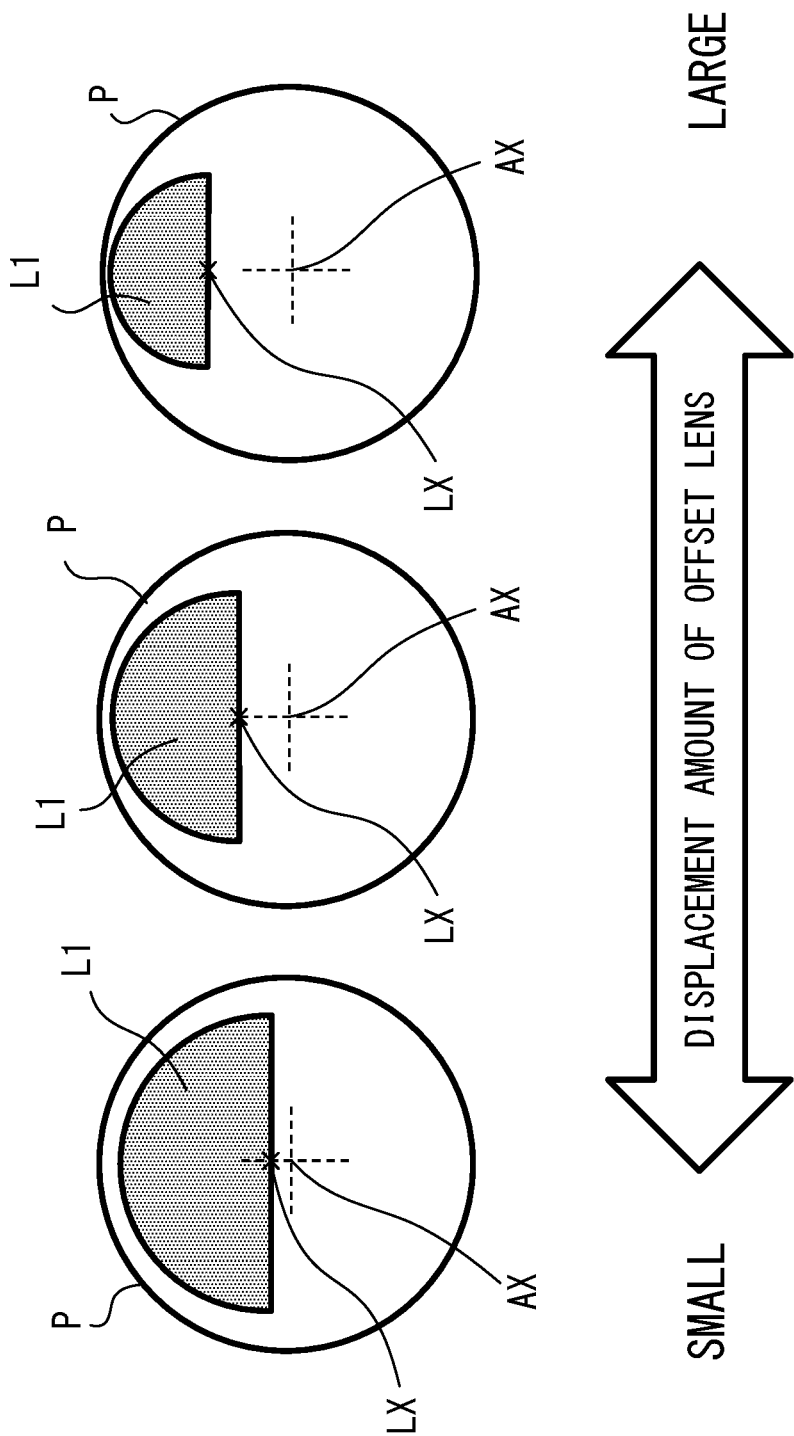
FIG. 2 illustrates a relationship between an amount of displacement of an offset lens and an amount of shift of an illumination light axis LX.

In the microscope apparatus 100, the mirror driver 144 may change the position of the illumination light axis LX by moving the illumination light axis LX with respect to the optical axis AX in accordance with the position of the offset lens 136. A beam diameter on a pupil plane P of the objective 111 changes according to an amount of displacement from a reference position of the offset lens 136 (a position in which a condensing position of the AF light L1 matches a focal position of the objective 111). In this example, the condensing position of the AF light L1 is located closer to the objective 111 than the focal position of the objective 111. Therefore, the AF light L1 emitted from the offset lens 136 enters an objective as a convergent flux of light, unlike a parallel flux of light at the time when the offset lens 136 is located in the reference position. When the offset lens 136 is moved in a state in which the optical axis AX of the objective 111 matches the optical axis LX of the AF light L1, a beam diameter of the AF light L1 on the pupil plane P of the objective 111 decreases. Accordingly, when the illumination light axis LX is fixed in a fixed position with respect to the optical axis AX, as an amount of displacement of the offset lens 136 increases, an angle of the AF light L1 incident on the specimen S, namely, a numerical aperture on a specimen surface decreases. It is not preferable that the numerical aperture decrease excessively because problems may be caused in focusing determination. Accordingly, in the microscope apparatus 100, by moving the position of the offset lens 136, namely, by moving the illumination light axis LX with respect to the optical axis AX in accordance with an amount of offset, as illustrated in FIG. 2, a numerical aperture on the specimen surface can be maintained within a range suitable for focusing determination. By doing this, focusing determination can be performed stably regardless of the position of the offset lens 136.

The numerical aperture on the specimen surface depends on a beam diameter in addition to the position of the illumination light axis LX. Accordingly, the microscope apparatus 100 may change the beam diameter in accordance with the position of the offset lens 136 by using the beam diameter selecting diaphragm 132, or may combine a change in the beam diameter and the movement of the illumination light axis LX. Also according to the methods above, the numerical aperture on the specimen surface can be maintained within a range suitable for focusing determination.

Figure 3:
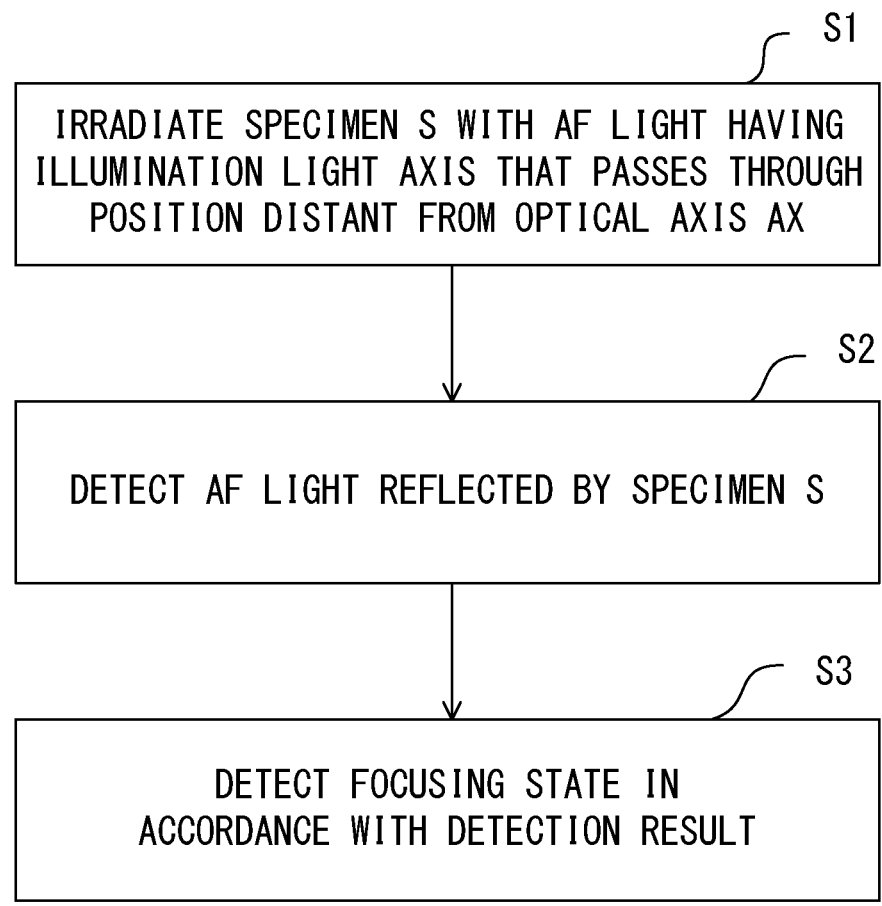
FIG. 3 is a flowchart illustrating a flow of processing performed by a microscope apparatus.

FIG. 3 is a flowchart illustrating a flow of processing performed by the microscope apparatus 100. As illustrated in FIG. 3, in the microscope apparatus 100, the specimen S is first irradiated with AF light L1 having the illumination light axis LX that passes through a position distant from the optical axis AX (step S1). AF light L2 reflected by the specimen S is detected by the photodetector 140 (step S2). Finally, the controller 141 detects a focusing state on the basis of a detection result of the photodetector 140 (step S3).

According to the automatic focusing method above, even when stray light is generated, the stray light can be suppressed from entering the photodetector 140. Accordingly, an adverse effect of the stray light on focusing determination can be suppressed without performing special signal processing on a signal output from the photodetector 140.

Example 2

FIG. 4 illustrates a configuration of a microscope apparatus 200 in this example. The microscope apparatus 200 illustrated in FIG. 4 is different from the microscope apparatus 100 in that the microscope apparatus 200 includes an automatic focusing device 230 instead of the automatic focusing device 130. In the other respects, the microscope apparatus 200 is similar to the microscope apparatus 100.

The automatic focusing device 230 is different from the automatic focusing device 130 in that the automatic focusing device 230 includes a shifter 231 that moves in parallel the AF light L1, a shifter driver 232 that drives a motor 233, and the motor 233, instead of the mirror driver 144 and the motor 145.

The shifter 231 is, for example, a parallel flat plate that the AF light L1 is transmitted through, and the shifter 231 is rotatably arranged in such a way that an angle of the AF light L1 incident on the shifter 231 changes by driving the motor 233. The AF light L1 shifts in a direction orthogonal to a traveling direction by a distance according to the angle incident on the shifter 231. Accordingly, when the dichroic mirror 137 is arranged at an angle of 45° with respect to the optical axis AX, the illumination light axis LX passes through a position distant from the optical axis AX by a distance of shift in the shifter 231.

The motor 233 is driven according to a signal from the shifter driver 232 under the control of the controller 141. Accordingly, in the microscope apparatus 200, the shifter driver 232 is an adjustment mechanism that moves the illumination light axis LX in a prescribed direction with respect to the optical axis AX by changing an angle of the AF light L1 incident on the shifter 231.

By using the automatic focusing device 230 and the microscope apparatus 200 having an adjustment mechanism different from that of the automatic focusing device 130 and the microscope apparatus 100, an adverse effect of stray light on focusing determination can be suppressed without performing special signal processing on a signal output from the photodetector 140.

Example 3

Figure 5:
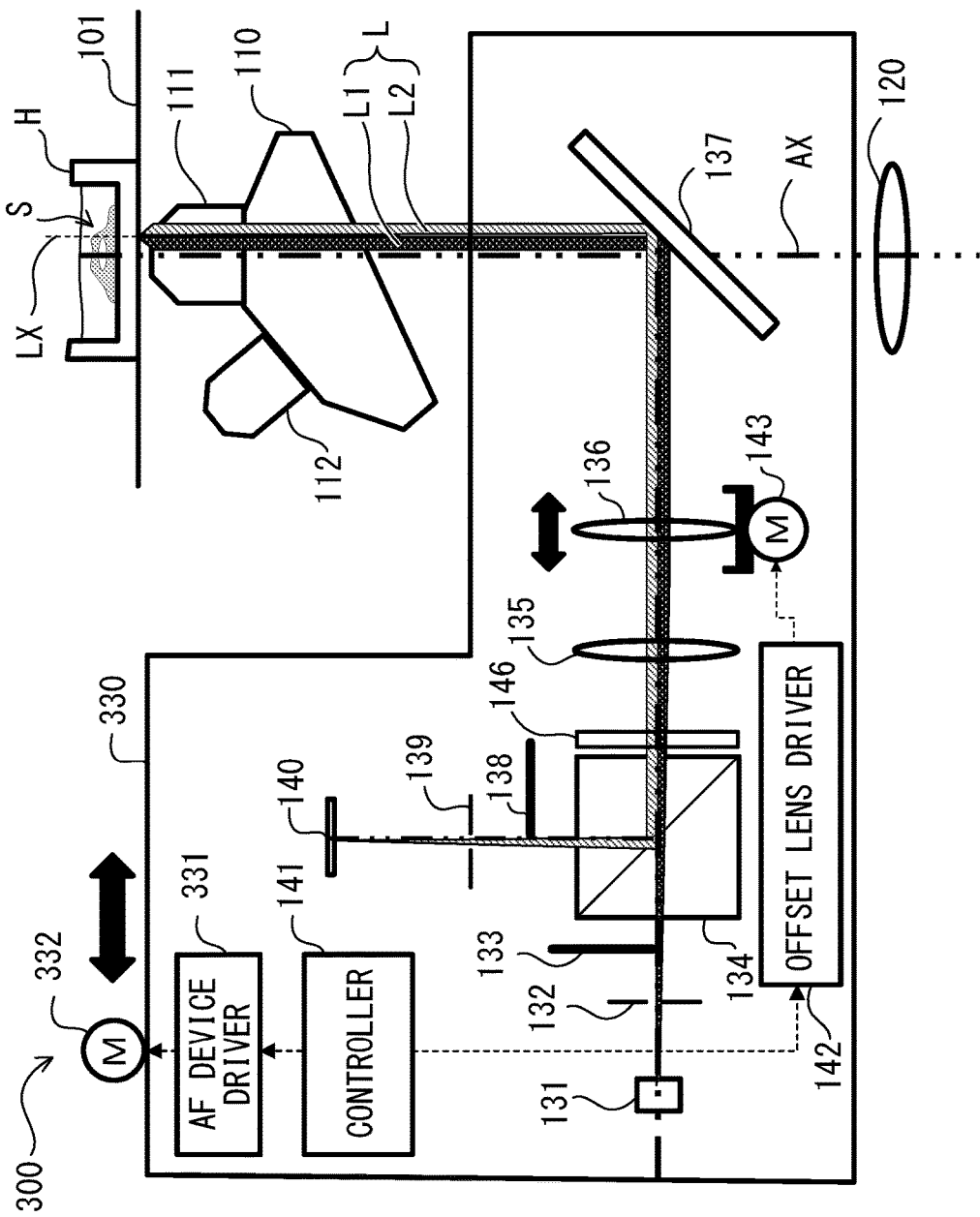
FIG. 5 illustrates a configuration of a microscope apparatus in Example 3.

FIG. 5 illustrates a configuration of a microscope apparatus 300 in this example. The microscope apparatus 300 illustrated in FIG. 5 is different from the microscope apparatus 100 in that the microscope apparatus 300 includes an automatic focusing device 330 instead of the automatic focusing device 130. In the other respects, the microscope apparatus 300 is similar to the microscope apparatus 100.

The automatic focusing device 330 is different from the automatic focusing device 130 in that the automatic focusing device 330 includes an AF device driver 331 that drives a motor 332, and the motor 332, instead of the mirror driver 144 and the motor 145.

The motor 332 is driven according to a signal from the AF device driver 331 under the control of the controller 141. By driving the motor 332, the automatic focusing device 330 moves in a direction orthogonal to the optical axis AX, and consequently the illumination light axis LX also moves with respect to the optical axis AX. Accordingly, in the microscope apparatus 300, the AF device driver 331 is an adjustment mechanism that moves the illumination light axis LX in a prescribed direction with respect to the optical axis AX by moving the automatic focusing device 330 in the prescribed direction with respect to the optical axis AX.

By using the automatic focusing device 330 and the microscope apparatus 300 having an adjustment mechanism different from that of the automatic focusing device 130 and the microscope apparatus 100, an adverse effect of stray light on focusing determination can be suppressed without performing special signal processing on a signal output from the photodetector 140.

The examples described above give specific examples of the present invention in order to easily understand the invention, and the present invention is not limited to the examples described above. Various variations or modifications of the microscope apparatus, the automatic focusing device, and the automatic focusing method can be made without departing from the spirit of the present invention specified in the claims.

As an example, the microscope apparatus is not limited to an inverted microscope apparatus, and an upright microscope apparatus may be employed. An example has been described in which the illumination light axis LX is located distant from the optical axis AX in order to eliminate stray light. However, a configuration in which the illumination light axis LX is located distant from the optical axis AX may be employed in order to control a numerical aperture in an automatic focusing device that does not have a problem due to stray light. The controller that is located within the automatic focusing device has been described, but any controller that is connected to an automatic focusing device may be employed. The controller may be located within a computer that controls a microscope apparatus that is connected to an automatic focusing device.

What is claimed is:

1. A microscope apparatus comprising:
an objective;
an automatic focusing device of an active type that irradiates a specimen with automatic focusing light via the objective, the automatic focusing device being configured in such a way that an illumination light axis of the automatic focusing light passes through a position offset from an optical axis of the objective; and
an adjustment mechanism that moves the illumination light axis of the automatic focusing light in a direction orthogonal to the optical axis of the objective while keeping the illumination light axis of the automatic focusing light parallel to the optical axis of the objective,
wherein the adjustment mechanism changes a position of the illumination light axis of the automatic focusing light in accordance with a type of the objective which is being used for observation, and
wherein the automatic focusing device includes an offset lens that moves a condensing position of the automatic focusing light in a direction of the optical axis of the objective, and the adjustment mechanism moves the illumination light axis in a prescribed direction with respect to the optical axis of the objective in accordance with a position of the offset lens.

2. The microscope apparatus according to claim 1, wherein the adjustment mechanism moves the automatic focusing device in the prescribed direction with respect to the optical axis of the objective.

3. The microscope apparatus according to claim 1, wherein the automatic focusing device includes a deflection element that deflects the automatic focusing light toward the objective, and the adjustment mechanism moves the deflection element in the prescribed direction with respect to the optical axis of the objective.

4. The microscope apparatus according to claim 3, wherein the prescribed direction is the direction orthogonal to the optical axis of the objective.

5. The microscope apparatus according to claim 1, wherein the automatic focusing device includes a shifter that moves the automatic focusing light, and the adjustment mechanism changes an angle of the automatic focusing light incident on the shifter.

6. The microscope apparatus according to claim 1, wherein the automatic focusing device includes a variable aperture diaphragm that changes a beam diameter of the automatic focusing light.

7. The microscope apparatus according to claim 1, wherein the automatic focusing device includes:
   a photodetector that detects the automatic focusing light reflected by the specimen;
   an optical system that condenses the automatic focusing light reflected by the specimen onto the photodetector; and
   a light shielding member that is arranged between the optical system and the photodetector, and in which an aperture is formed.

8. The microscope apparatus according to claim 7, wherein the light shielding member is a variable aperture diaphragm that freely changes a diameter of the aperture.

9. The microscope apparatus according to claim 7, wherein the light shielding member is movably arranged along an optical axis of the optical system.

10. The microscope apparatus according to claim 1, further comprising a revolver configured to accommodate a plurality of objectives.

11. A microscope apparatus comprising:
an objective;
an automatic focusing device of an active type that irradiates a specimen with automatic focusing light via the objective, the automatic focusing device being configured in such a way that an illumination light axis of the automatic focusing light passes through a position offset from an optical axis of the objective; and
an adjustment mechanism that moves the illumination light axis of the automatic focusing light in a direction orthogonal to the optical axis of the objective while keeping the illumination light axis of the automatic focusing light parallel to the optical axis of the objective,
wherein the adjustment mechanism moves the automatic focusing device in a prescribed direction with respect to the optical axis of the objective, and
wherein the automatic focusing device includes an offset lens that moves a condensing position of the automatic focusing light in a direction of the optical axis of the objective, and the adjustment mechanism moves the illumination light axis in the prescribed direction with respect to the optical axis of the objective in accordance with a position of the offset lens.

\* \* \* \* \*